(12) United States Patent
Ting et al.

(10) Patent No.: US 7,266,442 B2
(45) Date of Patent: Sep. 4, 2007

(54) ADAPTIVE THROTTLE MODEL FOR AIR INTAKE SYSTEM DIAGNOSTIC

(75) Inventors: Thomas L. Ting, Plymouth, MN (US); Bruce K. Walker, Cincinnati, OH (US)

(73) Assignee: GM Global Technology Operations, Inc., Detroit, MI (US)

( * ) Notice: Subject to any disclaimer, the term of this patent is extended or adjusted under 35 U.S.C. 154(b) by 166 days.

(21) Appl. No.: 11/226,063

(22) Filed: Sep. 14, 2005

(65) Prior Publication Data

US 2007/0061062 A1 Mar. 15, 2007

(51) Int. Cl.
*G06F 19/00* (2006.01)
*G01L 3/26* (2006.01)

(52) U.S. Cl. ..................... 701/114; 73/117.3
(58) Field of Classification Search ................ 701/101, 701/103, 114, 115; 123/434, 673, 690; 73/117.3, 73/118.1, 118.2
See application file for complete search history.

(56) References Cited

U.S. PATENT DOCUMENTS

| | | | | |
|---|---|---|---|---|
| 4,282,751 A | * | 8/1981 | Brown et al. ................. | 73/202 |
| 5,526,787 A | * | 6/1996 | Pallett ........................ | 123/399 |
| 5,546,907 A | * | 8/1996 | Komoriya et al. ........... | 123/478 |
| 5,549,092 A | * | 8/1996 | Hasegawa et al. .......... | 123/478 |
| 6,591,667 B1 | * | 7/2003 | Kotwicki et al. ........... | 73/118.1 |
| 6,640,622 B2 | * | 11/2003 | Soliman et al. ............ | 73/118.2 |
| 6,701,282 B2 | * | 3/2004 | Ting et al. .................. | 702/185 |
| 6,718,822 B2 | * | 4/2004 | Soliman et al. ............ | 73/118.2 |
| 2002/0198649 A1 | * | 12/2002 | Stotsky et al. ............. | 701/113 |
| 2003/0005756 A1 | * | 1/2003 | Soliman et al. ............ | 73/116 |
| 2003/0079721 A1 | * | 5/2003 | Kolmanovsky et al. ..... | 123/399 |
| 2004/0045526 A1 | * | 3/2004 | Kolmanovsky et al. ..... | 123/399 |

\* cited by examiner

*Primary Examiner*—John T. Kwon

(57) ABSTRACT

A method and system to optimize values of a plurality of calibration discharge coefficients useable in a computer program operable to estimate mass air flow into an internal combustion engine having an air intake system comprising a throttle body and a plurality of sensors is presented. This includes collecting engine operation data points, including throttle position. Discharge coefficients are calculated, one for each engine operation data point. The discharge coefficients are partitioned based upon throttle position. Calibration discharge coefficients are calculated for each partitioned plurality of discharge coefficients. This includes circumscribing each calibration discharge coefficient based upon predetermined thresholds. This further includes monitoring and collecting input signals correlatable to airflow from the sensors during ongoing engine operation, preferably comprising throttle position, manifold pressure, intake air temperature, and, atmospheric pressure.

16 Claims, 3 Drawing Sheets

ADAPTIVE THROTTLE MODEL FOR AIR INTAKE SYSTEM DIAGNOSTIC

TECHNICAL FIELD

This invention pertains generally to diagnostic systems for internal combustion engine control systems, and more specifically to an adaptive model for an engine control diagnostic system.

INCORPORATION BY REFERENCE

Applicant incorporates by reference commonly assigned U.S. Pat. No. 6,701,282 B2, issued to Ting, et al., and entitled Fault Identification Diagnostic for Intake System Sensors, in that the fault identification system for an air intake system need not be fully described in detail herein.

BACKGROUND OF THE INVENTION

Vehicle manufacturers are required to produce vehicles having on-board diagnostic systems which monitor various engine, powertrain, and vehicle systems and identify various malfunctions that lead to discernible increases in emissions. One such diagnostic system comprises an engine intake flow rationality diagnostic algorithm, which has been implemented to monitor measurable parameters which contribute to determining flow of intake air into an engine. Introduction of new intake system technology onto engines, including for example, variable valve timing systems, and cylinder deactivation systems, has complicated the ability of engine intake flow rationality diagnostic algorithms to effectively monitor and diagnose various engine components that provide input to the engine intake flow rationality diagnostic algorithm.

Measurable parameters used by the engine intake flow rationality diagnostic algorithm may include, for example, ambient air pressure, ambient air temperature, intake manifold pressure, throttle valve position, idle air control valve position, and mass airflow measurement. The algorithm monitors the specific measurable parameters, and executes one or more computer models to calculate expected values for intake airflow. The engine intake flow rationality diagnostic algorithm is able to determine whether components including a throttle position sensor (TPS), manifold absolute pressure sensor (MAP), mass airflow sensor (MAF), and idle air control device (IAC) are operating within allowable ranges, taking into account various factors. Factors that may affect output of a typical engine intake flow rationality diagnostic algorithm include operating conditions and measured parameters, and sources of variation due to component tolerances, component tolerance stack-ups, vehicle-to-vehicle variations, and, operator-to-operator variations, all occurring over a broad range of environmental and road conditions.

The engine intake flow rationality diagnostic algorithm includes a throttle model comprising a computer-executable algorithm, which calculates mass flow of intake air through the engine throttle body as a function of measured parameters, including ambient air pressure, ambient intake air temperature, intake manifold pressure, throttle valve position, and idle air control valve position, when applicable. The throttle model uses data points comprising the measured parameters, coupled with empirically determined coefficients, to calculate the mass air flow into the engine at a time-certain, i.e. a specific point in time. One coefficient is the discharge coefficient, $C_d$, comprising a calibratable table of discharge coefficient values correlated to discrete measures of throttle position (typically a discharge coefficient determined for every, ten percent of throttle angle) stored in the on-board computer. The throttle model is preferably executed in the on-board computer by capturing the measured parametric values, determining an applicable discharge coefficient $C_d$ based upon throttle position, and executing algorithms comprising flow equations to determine expected engine airflow based upon the discharge coefficient and the measured parametric values. The currently employed throttle models feature discharge coefficients which are held constant at each throttle position for a given throttle body design applied to a specific engine configuration.

On-vehicle research of a fleet of vehicles has indicated that the throttle body may comprise a significant source of vehicle-to-vehicle performance variation for the aforementioned engine intake flow rationality diagnostic. This vehicle-to-vehicle performance variation is due, at least in part, to part-to-part variation in airflow across the throttle valve, determined as a function of the measured parameter, throttle position.

Therefore, what is needed is a throttle model that adapts to each individual vehicle. Adapting the throttle model to each individual vehicle requires a method to determine a plurality of discharge coefficients that are specific to an individual vehicle. The result includes reducing variation, thus improving robustness of the engine intake flow rationality diagnostic. Adapting the throttle model to each individual vehicle facilitates introduction of a robust engine intake flow rationality diagnostic on engine systems employing new air intake system technologies.

SUMMARY OF THE INVENTION

The engine intake flow rationality diagnostic detects and isolates faults in four different engine components: the mass air flow and manifold pressure sensors and the throttle and idle valve operation. In order to achieve the object of adapting the throttle model to an individual vehicle, a method and apparatus to determine a plurality of discharge coefficients specific to the individual vehicle is provided.

Therefore, in accordance with the present invention, a method to optimize values of a plurality of calibration discharge coefficients useable in a computer program operable to estimate mass air flow into an internal combustion engine having an air intake system comprising a throttle body and a plurality of sensors is presented. This includes collecting a plurality of engine operation data points, including throttle position. A plurality of discharge coefficients are calculated, one discharge coefficient for each engine operation data point. The discharge coefficients are partitioned based upon the throttle position. Calibration discharge coefficients are calculated for each partitioned plurality of discharge coefficients.

Another aspect of the invention includes circumscribing each calibration discharge coefficient based upon predetermined thresholds.

Another aspect of the invention includes monitoring and collecting input signals correlatable to airflow from the plurality of sensors during ongoing engine operation, wherein the plurality of sensors comprise a throttle position sensor, a manifold pressure sensor, and, a mass airflow sensor; and, the plurality of input signals comprising throttle position, manifold absolute pressure, intake air temperature, and, atmospheric pressure.

Another aspect of the invention includes executing a computer program comprising an equation operable to calculate a discharge coefficient based upon each engine operation data point.

Another aspect of the invention includes assigning each of the plurality of discharge coefficients into one of a series of data bins, each data bin defined by a throttle position breakpoint.

Another aspect of the invention includes each data bin corresponding to one of the series of throttle position breakpoints plus or minus five percent of throttle position.

Another aspect of the invention includes each data bin corresponding to one of the series of throttle position breakpoints plus or minus one throttle position breakpoint.

Another aspect of the invention includes executing a least-squares regression analysis algorithm for each partitioned plurality of discharge coefficients.

Another aspect of the invention includes optimizing values of the calibration discharge coefficients during vehicle assembly.

Another aspect of the invention includes optimizing values of the calibration discharge coefficients during ongoing vehicle operation.

Another aspect of the invention includes a method to update a coefficient for a math simulation representing airflow measurement into an internal combustion engine having an air intake system comprising a throttle body and a plurality of sensors.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
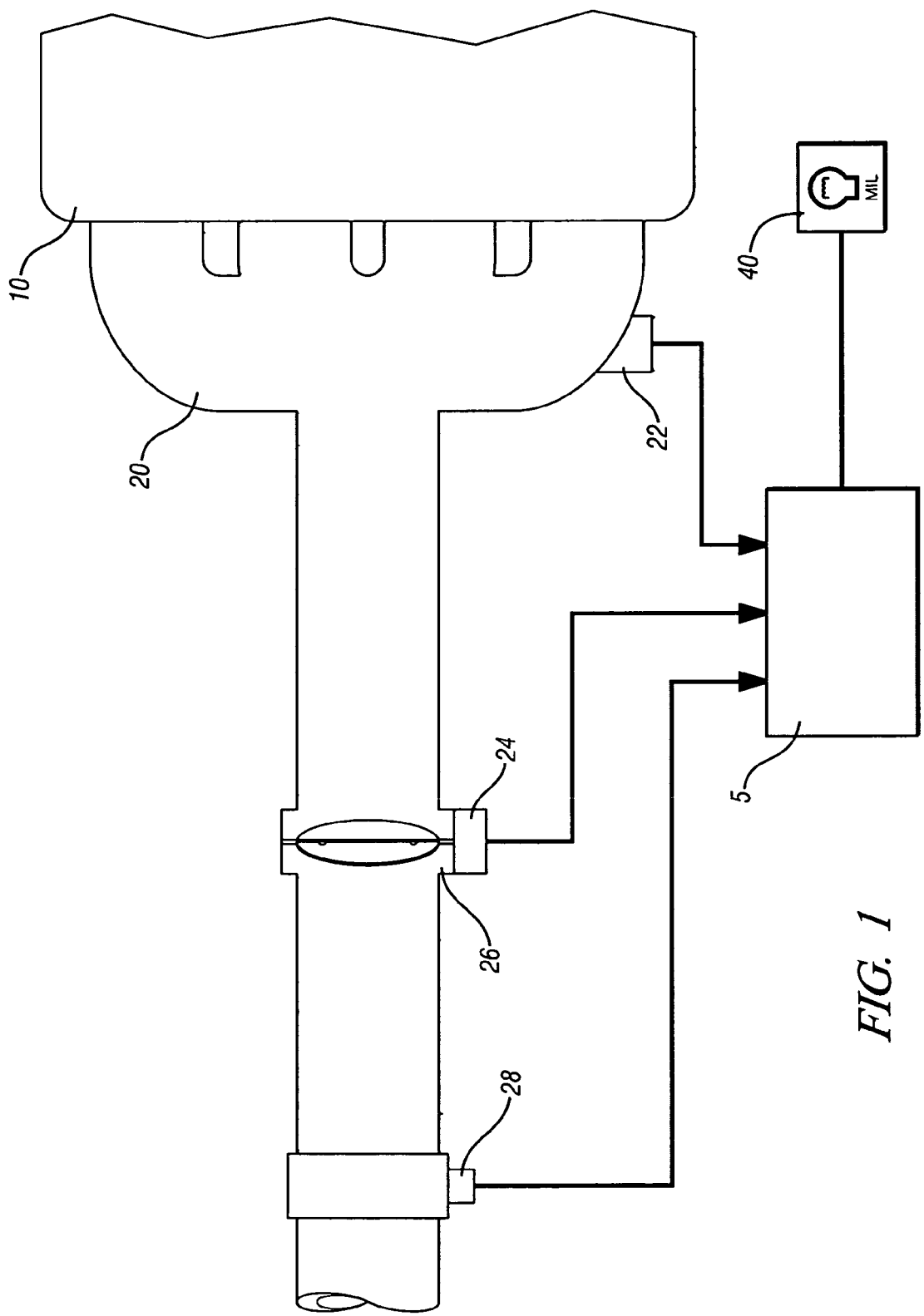
FIG. 1 is a schematic diagram of an engine and intake system, in accordance with the present invention.

Referring now to the drawings, wherein the showings are for the purpose of illustrating the invention only and not for the purpose of limiting the same, FIG. 1 shows an internal combustion engine and control system which has been constructed in accordance with an embodiment of the present invention.

The exemplary engine and control system comprises a conventional four-cycle internal combustion engine 10 controlled by an electronic controller 5. The engine 10 includes a plurality of reciprocating pistons attached to a crankshaft, which is operably attached to a vehicle driveline. The exemplary engine includes an air intake system including an inlet, an air filter, and duct work channeling intake air to the throttle 26. A mass air flow sensor (MAF) 28 is preferably employed to measure air flow during ongoing operation, and may additionally provide intake air temperature (IAT). The throttle 26 comprises a known device having a rotatable throttle blade mounted on a shaft, and having a throttle position sensor (TPS) 24 operable to measure position of the throttle blade, which is correlatable to air flow through the throttle, as is known to a skilled practitioner. The throttle 26 may be actuated by a cable device attached to an accelerator pedal with an optional cruise control device, or alternatively, the throttle may be actuated by an electronic throttle control system. Air is inlet to an intake manifold 20, through the throttle 26, for distribution to the engine cylinders. The intake manifold 20 preferably has a manifold absolute pressure sensor (MAP) 22 operably attached to measure manifold absolute pressure, and further operable to measure barometric pressure (BARO). Other sensors, e.g. an air intake temperature sensor, and other devices, e.g. idle air control valve, may be implemented in a specific system, and useable when so implemented.

The engine controller 5 is preferably an electronic control module comprising a central processing unit signally electrically connected to volatile and non-volatile memory devices via data buses. The controller 5 is operably attached to sensing devices and other output devices to ongoingly monitor and control engine operation. The output devices preferably include subsystems necessary for proper control and operation of the engine, including, by way of example, an air intake system, a fuel injection system, a spark-ignition system (when a spark-ignition engine is used), an exhaust gas recirculation system, and an evaporative control system. The engine sensing devices include devices operable to monitor engine operation, external, conditions, and operator demand, and are typically signally attached to the controller 5 via wiring harnesses.

Algorithms stored in the non-volatile memory devices are executed by the central processing unit and are operable to monitor inputs from the sensing devices and execute engine control and diagnostic routines to control operation of the engine, using preset calibrations. Algorithms are typically executed during preset loop cycles, with each control algorithm executed at least once each loop cycle. Loop cycles are typically executed each 3, 6.25, 15, 25 and 100 milliseconds during engine operation. Alternatively, control algorithms may be executed in response to occurrence of an event. A cyclical event, e.g. calculation of engine fueling, may be executed each engine cycle. A diagnostic algorithm may be executed once per engine key-on cycle. A diagnostic algorithm may have further limitations including requirements for achieving specific enablement criteria before execution. Use of the controller 5 to control and diagnose operation of various aspects of the internal combustion engine is well known to one skilled in the art.

The intake flow rationality diagnostic comprises a specific diagnostic algorithm described in commonly assigned U.S. Pat. No. 6,701,282 B2, issued to Ting, et al., and entitled Fault Identification Diagnostic for Intake System Sensors. The intake flow rationality diagnostic is incorporated by reference hereinabove, in that the diagnostic algorithm and the throttle model used for the fault identification system for an air intake system need not be fully described in detail herein. The throttle model of the intake flow rationality diagnostic comprises a computer-executable model operable to estimate mass air flow through a throttle based upon measured parameters including barometric pressure (BARO), throttle position (TPS), intake air temperature (IAT), manifold absolute pressure (MAP), the compressible flow function, $\psi$, and calibration discharge coefficients, $C_d$. Idle air control (IAC) is useable by the model, when a separate idle air control system is mechanized. The calibration discharge coefficients, $C_d$, and compressible flow function, $\psi$ are each executed as two-dimensional lookup tables, stored in software memory of the controller. An exemplary calibration table of discharge coefficients, referred to as CAL_Cd[TPSx], and based upon throttle position (per cent), is shown, as below.

| Throttle Position (Percent) | Calibration Discharge Coefficient, CAL_Cd[TPSx] |
|---|---|
| 1 | 4.0 |
| 10 | 2.7 |
| 20 | 1.8 |
| 30 | 1.3 |
| 40 | 1.2 |
| 50 | 1.2 |
| 60 | 1.3 |
| 70 | 1.3 |
| 80 | 1.3 |
| 90 | 1.3 |
| 100 | 1.3 |

Figure 2:
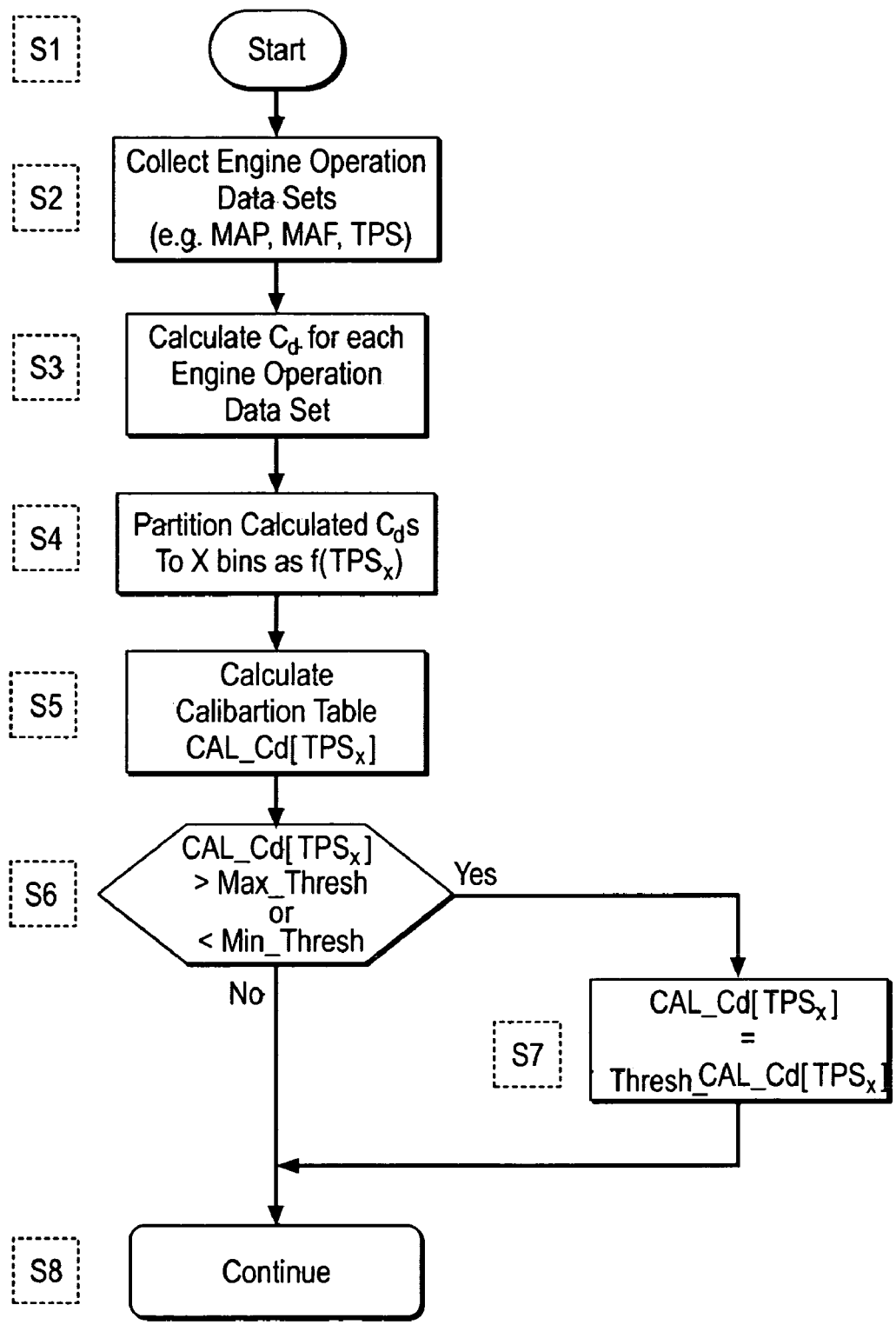
FIG. 2 is a schematic diagram of an algorithmic flowchart, in accordance with the present invention; and, FIGS. 3 and 4 are exemplary data graphs, in accordance with the present invention.

Referring now to FIG. 2, a method to optimize values of the table of calibration discharge coefficients, CAL_Cd [TPSx], useable in the aforementioned computer program to estimate mass air flow into the internal combustion engine 10, is provided. The method to optimize values of calibration discharge coefficients is executed as one or more algorithms in the controller 5, and includes collecting engine operation data points S2, and calculating a discharge coefficient, $C_d$, for engine operation data point, S3. The discharge coefficients, $C_d$, are electronically partitioned based upon the throttle position, S4, as detailed hereinbelow. Calibration discharge coefficients, CAL_Cd[TPSx], comprising updated discharge coefficients useable in the computer table, as above, are calculated, S5, with one calibration discharge coefficient calculated for each partitioned discharge coefficient, based upon the specific throttle position, TPSx. In the exemplary table shown, a calibration discharge coefficient CAL_Cd[TPSx] is calculated for each throttle position, TPSx, in the calibration table, equal to 1, 10, 20, 30, 40, 50, 60, 70, 80, 90, and 100 (in per cent). Each calibration discharge coefficient, CAL_Cd[TPSx], is compared to an upper and lower threshold value, S6, which is determined for each calibration throttle position. When the calibration discharge coefficient is greater than the maximum threshold, or less than the minimum threshold, the calibration discharge coefficient CAL_Cd[TPSx], for that throttle position is made equal to the corresponding threshold value, S7. The resultant table of calibration discharge coefficients, CAL_Cd [TPSx], is stored as data in memory of the engine controller 5, as shown hereinabove, for use in executing the throttle model, further to facilitate more accurate results from execution of the intake flow rationality diagnostic.

Collecting each engine operation data point, S2, preferably comprises the controller 5 monitoring the aforementioned input signals correlatable to airflow useable in the computer-executable model. As previously described, a data point preferably includes the parameters of barometric pressure (BARO), throttle position (TPS), intake air temperature (IAT), manifold absolute pressure (MAP), and, mass air flow (MAF), measured at a time-certain. A data point comprising the aforementioned parameters is typically collected each 6.25 milliseconds of engine operation, and stored within the computer memory at least until a discharge coefficient is calculated for the data. A value for discharge coefficient, $C_d$, is calculated for each engine operation data point, comprising executing a computer program comprising an equation operable to calculate the discharge coefficient for each engine operation data point. This comprises executing the throttle model, as described hereinafter.

The throttle model, also described in commonly assigned U.S. Pat. No. 6,701,282 B2, issued to Ting, et al., and entitled Fault Identification Diagnostic for Intake System Sensors, and herein incorporated by reference, has been developed using the theory of ideal gas flow through an orifice, and known to a skilled practitioner. Here, the airflow, $m_t$, through the throttle opening is given by Equation 1:

$$m_t = \frac{(C_d A + C_{di} A_i) P_\infty \psi}{\sqrt{R T_\infty}} \quad [\text{Eq. 1}]$$

wherein $P_\infty$ is the ambient air pressure, $T_\infty$ is the ambient air temperature, R is the ideal gas constant for air, A and $A_i$ are the effective cross-sectional areas for the throttle and IAC valve openings (when used), and $C_d$ and $C_{di}$ are discharge coefficients for the throttle and idle air valve (when used), and $\psi$ is the compressible flow function defined in Eq. 2 as:

$$\psi = \begin{bmatrix} \sqrt{\frac{2k}{k-1}\left(P_r^{2/k} - P_r^{(k+1)/k}\right)} & \text{if } P_c < P_r < 1 \\ \sqrt{k\left(\frac{2}{k+1}\right)^{(k+1)/(k-1)}} & \text{if } P_r < P_c \end{bmatrix} \quad [\text{Eq. 2}]$$

In a very broad sense, the compressible flow function $\psi$ accounts for the changes in airflow due to pressure changes on either side of the throttle orifice. Conversely, $C_d A + C_{di} A_i$ accounts for changes in airflow due to changes in the effective flow area of the throttle orifice and idle device. The compressible flow function $\psi$ depends upon the relative pressure ratio:

$$P_r = \frac{P}{P_\infty}, \quad [\text{Eq. 3}]$$

wherein P is the manifold absolute pressure, and the specific heat constant k which has a value of 1.4 for air. In particular, note the dependence between $\psi$ and the critical relative pressure ratio:

$$P_c = \left(\frac{2}{k+1}\right)^{k/(k+1)}. \quad [\text{Eq. 4}]$$

For air, this ratio is $P_c = 0.5283$.

The throttle operation is characterized by two physical parameters: $A_0$ represents the throttle bore (the cross-sectional area corresponding to a fully open throttle) and $\theta_0$ represents the throttle offset angle (such that a fully open throttle corresponds to $\Pi/2 - \theta_0$ radians). The cross-sectional throttle area A is computed from throttle position by Eq. 5:

$$A(\% \ T) = A_0 \left[1 - \frac{\cos(\theta + \theta_0)}{\cos\theta_0}\right] = A_0 f(\% \ T) \qquad \text{[Eq. 5]}$$

wherein the measured throttle position measurements (% T), given as percentage of fully open throttle, are easily converted to an angular value by multiplying by $\Pi/2-\theta_0$. Subtracting the MAF value associated with the IAC flow and utilizing the throttle flow area variation factor, Eq. 1 is rewritten as Eq. 6, below:

$$C_d(\% \ T) = \frac{(MAF - MAF_{idle})\sqrt{RT_\infty}}{\psi f(\% \ T)P_\infty A_0}. \qquad \text{[Eq. 6]}$$

Now using the measured vehicle data and substituting Eq. 2 into Eq. 6, discharge coefficient as a function of measured throttle position, $C_d(\% \ T)$ is determinable, as shown. A skilled practitioner is able to execute Eq. 4 into computer-executable code, and program the engine controller 5 to couple the aforementioned input signals with the compressible flow function, $\psi$ to calculate discharge coefficient, $C_d(\% \ T)$.

Figure 3:
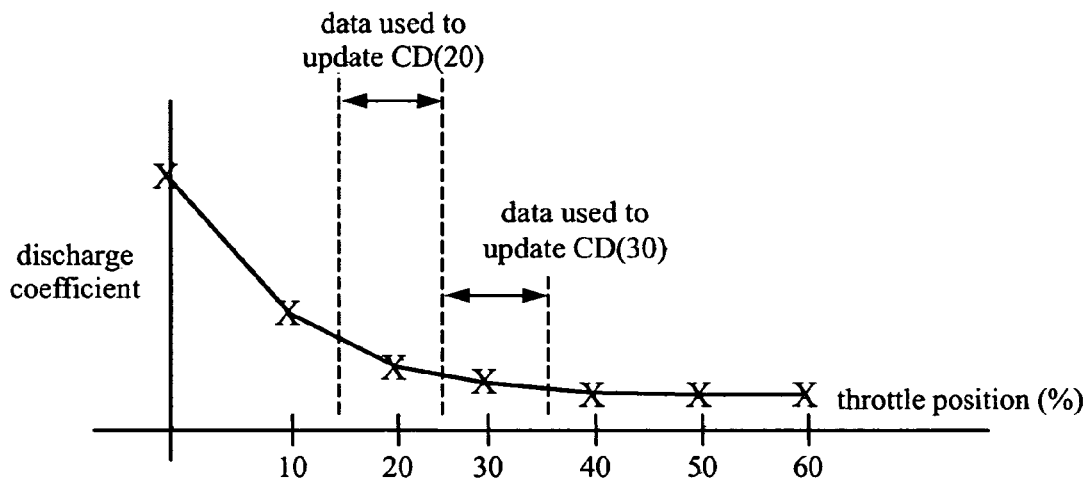
Figure 4:
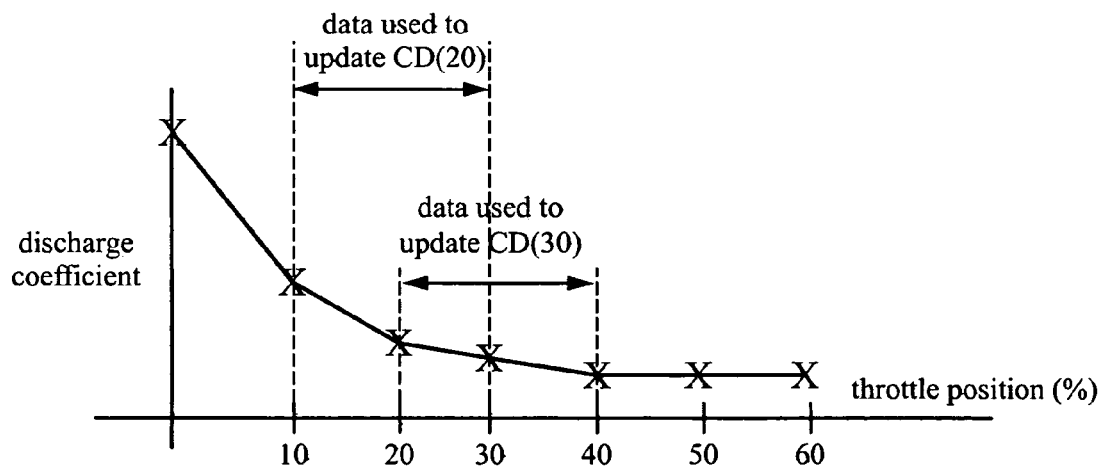

The discharge coefficients, $C_d(\% \ T)$, calculated for the collected data points, are partitioned, preferably by assigning each discharge coefficient $C_d(\% \ T)$ into one of a series of data bins, each data bin defined by a throttle position breakpoint, S4. A first embodiment, referred to as single breakpoint adaptive model concept, is shown with reference to FIG. 3. In this model, each data bin is defined by a throttle position breakpoint comprising one of the series of throttle position breakpoints plus or minus halfway to the next throttle breakpoint, which is plus or minus five percent of throttle position, in this embodiment. Therefore, each data bin stops at a throttle position point wherein the next bin starts, and there is no overlapping or shared data. In the first embodiment, with calibration table breakpoints at 1%, 10%, 20%, 30%, . . . 100% of throttle, applying the single breakpoint adaptive model concept yields breakpoints for 1% TPS: 1% and 5%; for 10% TPS: 5% and 15%; for 20% TPS: 15% and 25%; etc. Alternatively, a second embodiment, referred to as a double breakpoint adaptive model concept, is shown with reference to FIG. 4. In this model, each data bin defined by a throttle position breakpoint comprising one of the series of throttle position breakpoints plus or minus one throttle position breakpoint. In the second embodiment, with breakpoints at 1%, 10%, 20%, 30%, . . . 100% of throttle, applying the double breakpoint adaptive model concept yields breakpoints for 1% TPS: 1% and 5%; 10% TPS: 1% and 20%; 20%TPS: 10% and 30%; etc. In this second embodiment, each data point may fall into one or two bins, depending upon the specific throttle position breakpoint.

Once the discharge coefficients, $C_d(\% \ T)$, are calculated and partitioned, as described hereinabove, the calibration discharge coefficients for each TPS setting in the calibration table, CAL_Cd[TPSx], are determined. This preferably comprises analyzing the discharge coefficients contained in each data bin by executing a least-squares regression algorithm, known, to a skilled practitioner.

Each calibration discharge coefficient, CAL_Cd[TPSx], is compared to a maximum threshold value, Max_Thresh (TPSx), and a minimum threshold value, Min_Thresh (TPSx), each predetermined for each calibration throttle position. When the calibration discharge coefficient is greater than the maximum threshold, or less than the minimum threshold, the calibration discharge coefficient for that throttle position is made equal to the corresponding threshold value, i.e., CAL_Cd[TPSx]=Max_Thresh(TPSx), or, CAL_Cd[TPSx]=Min_Thresh(TPSx), S7.

The resultant calibration discharge coefficients, CAL_Cd [TPSx], are stored as data in the calibration table, as shown hereinabove, for use by the controller 5 in the throttle model, to execute the intake flow rationality diagnostic.

The process of calculating and optimizing the calibration discharge coefficients, comprising the algorithm described with reference to FIG. 2, may occur during vehicle assembly, at the end of line. Alternatively, or additionally, the process of calculating and optimizing the calibration discharge coefficients may occur during ongoing vehicle operation in-use.

The software of the controller 5 may be further enhanced to monitor and identify when one of the calibration discharge coefficients, CAL_Cd[TPSx], is greater than the maximum threshold, Max_Thresh(TPSx), or less than the minimum threshold, Min_Thresh(TPSx), for that throttle position, TPSx. In either case, the software of the controller may record and store exceedance of the threshold to determine whether further analysis of the data is required to effectively monitor and execute the engine intake flow rationality diagnostic algorithm in accordance with current regulatory schemes, ongoing engine operation, and customer satisfaction needs.

It is understood that the invention is described around a conventional four-cycle, naturally-aspirated, internal combustion engine, but it is understood that the invention is equally applicable to any internal combustion engine having an air intake system, wherein accurate determination of mass of air into the engine is critical to diagnostic operation or to engine control. This includes such variations as engines having supercharged air intake, and engines having various engine intake and exhaust valve control, including cam phasing, two-step valve lift, cylinder deactivation, or camless operation. The invention has been described with specific reference to the preferred embodiments and modifications thereto. Further modifications and alterations may occur to others upon reading and understanding the specification. It is intended to include all modifications and alterations insofar as they come within the scope of the invention.

Having thus described the invention, it is claimed:

1. Method to optimize values of a plurality of calibration discharge coefficients useable in a computer program operable to estimate mass air flow into an internal combustion engine having an air intake system comprising a throttle body and a plurality of sensors, comprising:
   a) collecting a plurality of engine operation data points, including throttle position;
   b) calculating a plurality of discharge coefficients, wherein one discharge coefficient is calculated for each engine operation data point;
   c) partitioning the plurality of discharge coefficients, based upon the throttle position;
   d) calculating a plurality of calibration discharge coefficients, wherein a calibration discharge coefficient is calculated for each partitioned plurality of discharge coefficients.

2. The method of claim 1, further comprising circumscribing each calibration discharge coefficient based upon predetermined thresholds.

3. The method of claim 1, wherein collecting each engine operation data point, including throttle position, comprises monitoring and collecting input parameters, correlatable to airflow, from the plurality of sensors during ongoing engine operation, and, further comprising:
   e) the plurality of sensors comprising: a throttle position sensor, a manifold pressure sensor, and, a mass airflow sensor; and,
   f) the plurality of input parameters comprising throttle position, manifold absolute pressure, mass air flow, intake air temperature, and, atmospheric pressure.

4. The method of claim 3, wherein calculating the plurality of calibration discharge coefficients, wherein a calibration discharge coefficient is calculated for each partitioned plurality of discharge coefficients, based upon the throttle position, comprises: executing a computer program comprising an equation operable to calculate a discharge coefficient based upon each engine operation data point.

5. The method of claim 1, wherein partitioning the plurality of discharge coefficients, based upon the throttle position, comprises: assigning each of the plurality of discharge coefficients into one of a series of data bins, each data bin defined by a throttle position breakpoint.

6. The method of claim 5, wherein each data bin defined by a throttle position breakpoint comprises: each data bin corresponding to one of the series of throttle position breakpoints plus or minus five percent of throttle position.

7. The method of claim 5, wherein each data bin defined by a throttle position breakpoint comprises: each data bin corresponding to one of the series of throttle position breakpoints plus or minus one throttle position breakpoint.

8. The method of claim 5, wherein calculating the plurality of calibration discharge coefficients, wherein one calibration discharge coefficient is calculated for each partitioned plurality of discharge coefficients, based upon the throttle position comprises: executing a least-squares regression analysis algorithm for each partitioned plurality of discharge coefficients.

9. The method of claim 1, further comprising optimizing values of the plurality of calibration discharge coefficients useable in a computer program operable to estimate mass air flow into an internal combustion engine having an air intake system comprising a throttle body and a plurality of sensors during vehicle assembly.

10. The method of claim 1, further comprising optimizing values of the plurality of calibration discharge coefficients useable in a computer program operable to estimate mass air flow into an internal combustion engine having an air intake system comprising a throttle body and a plurality of sensors during ongoing vehicle operation.

11. Method to update a coefficient for a math simulation representing airflow measurement into an internal combustion engine having an air intake system comprising a throttle body and a plurality of sensors, comprising:
   a) identifying a specific range of an engine operating parameter corresponding to the coefficient for the math simulation;
   b) collecting a plurality of engine operation data points which fall within the range of the engine operating parameter;
   c) calculating a plurality of discharge coefficients based upon the plurality of engine operation data points; and,
   d) calculating a calibration discharge coefficient.

12. The method of claim 11, further comprising:
   e) comparing the calibration discharge coefficient to a threshold;
   f) setting the calibration discharge coefficient equal to the threshold when the calibration discharge coefficient falls outside an allowable range determined by the threshold.

13. The method of claim 12 wherein identifying the specific range of the engine operating parameter corresponding to the coefficient for the math simulation comprises:
   a) monitoring throttle position; and,
   b) identifying a predetermined range of throttle positions.

14. The method of claim 12, wherein collecting a plurality of engine operation data points which fall within the range of the engine operating parameter comprises collecting data based upon an engine manifold pressure sensor and a throttle position sensor.

15. Method to improve accuracy of an on-vehicle computer program for estimating mass air flow into an internal combustion engine, the computer program operable to estimate mass air flow based upon input from a plurality of engine sensors and a plurality of calibration discharge coefficients, comprising:
   a) optimizing values of the plurality of calibration discharge coefficients, comprising:
      i) collecting a plurality of engine operation data points including throttle position from the plurality of engine sensors;
      ii) calculating a plurality of discharge coefficients, wherein one discharge coefficient is calculated for each engine operation data point;
      iii) partitioning the plurality of discharge coefficients, based upon the throttle position;
      iv) calculating a plurality of calibration discharge coefficients, wherein one calibration discharge coefficient is calculated for each partitioned plurality of discharge coefficients, based upon the throttle position; and,
   b) executing the on-vehicle computer program for estimating mass air flow into the internal combustion engine with the optimized values for the plurality of calibration discharge coefficients.

16. Article of manufacture comprising a storage medium having a computer program encoded therein for effecting a method to improve accuracy of an on-vehicle computer program for estimating mass air flow into an internal combustion engine, the computer program operable to estimate mass air flow based upon input from a plurality of engine sensors and a plurality of calibration discharge coefficients, comprising:
   a) code for collecting a plurality of engine operation data points including throttle position from the plurality of engine sensors;
   b) code for calculating a plurality of discharge coefficients, wherein one discharge coefficient is calculated for each engine operation data point;
   c) code for partitioning the plurality of discharge coefficients, based upon the throttle position;
   d) code for calculating a plurality of calibration discharge coefficients, wherein one calibration discharge coefficient is calculated for each partitioned plurality of discharge coefficients, based upon the throttle position; and,
   e) code for executing the on-vehicle computer program for estimating mass air flow into the internal combustion engine with the optimized values for the plurality of calibration discharge coefficients.

* * * * *